United States Patent Office 3,301,893
Patented Jan. 31, 1967

3,301,893
FLUOROCARBON ETHERS CONTAINING SULFONYL GROUPS
Robert Ervin Putnam and William Dickson Nicoll, Wilmington, Del., assignors to E. I. du Pont de Nemours and Company, Wilmington, Del., a corporation of Delaware
No Drawing. Filed Aug. 5, 1963, Ser. No. 300,076
7 Claims. (Cl. 260—513)

The present invention relates to novel fluorocarbon ethers and to methods for their preparation. More particularly, the present invention relates to fluorocarbon ether acids and acid derivatives.

The fluorocarbon ethers of the present invention have the general formula

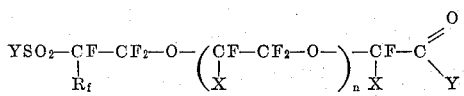

where $R_f$ is a radical selected from the class consisting of fluorine and perfluoroalkyl radicals having from 1 to 10 carbon atoms, X is a radical selected from the class consisting of fluorine, the trifluoromethyl radical, and mixtures thereof where the formula contains more than one X, Y is a radical selected from the class consisting of fluorine, amino, hydroxyl and —OMe radicals, where Me is a radical selected from the class consisting of the ammonium radical, alkali metals and other monovalent metals, and where $n$ represents the number of repeating ether units and is a number from 0 to about 12.

The fluorocarbon ethers of the present invention are prepared by the following reaction

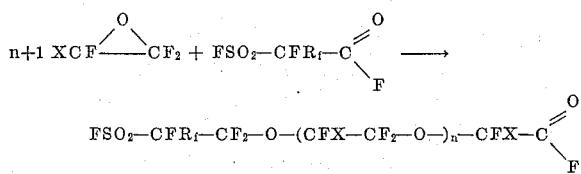

where $R_f$, X and $n$ have the indicated meanings.

The fluorocarbon ethers prepared by this reaction are then further reacted through standard chemical reactions to form the carboxylic acid and the carboxylic acid derivatives and sulfonic acid and sulfonic acid derivatives.

The alpha-fluorosulfonyl perfluoroacyl fluorides employed in the formation of the fluorocarbon ethers of the present invention are prepared by the reactions disclosed in U.S. Patent 2,852,554, issued to D. C. England on September 16, 1958. Hexafluoropropylene epoxide is prepared by the oxidation of hexafluoropropylene using aqueous alkaline hydrogen peroxide. Tetrafluoroethylene epoxide is prepared by the oxidation of tetrafluoroethylene, using oxygen under the influence of actinic radiation.

The reaction of the hexafluoropropylene epoxide with the alpha-fluorosulfonyl perfluoroacyl fluoride is carried out in a polar organic solvent. Suitable solvents are organic solvents liquid at the reaction temperature and capable of dissolving, i.e., to an extent of greater than 0.01 weight percent, perfluorocarbon alkoxides of alkali metals and specifically cesium perfluoropropoxide. The alkoxides can be formed by the reaction of metal fluorides with perfluoroacyl fluorides. In particular, however, the preferred organic solvents used in combination with hexafluoropropylene epoxide are aliphatic polyethers having from 4 to 16 carbon atoms and hydrocarbon nitriles having from 2 to 12 carbon atoms, such as the dimethyl ether of ethylene glycol, the dimethyl ether of diethylene glycol, dioxane, propionitrile, benzonitrile and acetonitrile. Other highly polar solvents which meet the foregoing qualifications, but which are not nitriles nor polyethers, include dimethyl sulfoxide, N-methyl pyrrolidone, nitroethane and tetrahydrofuran.

The reaction of tetrafluoroethylene epoxide with the alpha-fluorosulfonyl perfluoroacyl fluoride is carried out in an inert solvent or diluent. The solvents employed are liquid halogenated alkanes capable of dissolving the quaternary ammonium salt catalysts in the catalytic concentrations required and capable of dissolving tetrafluoroethylene epoxide without reacting with the tetrafluoroethylene epoxide. The suitable halogenated alkanes generally contain from 1 to 12 carbon atoms. It was found that halogenated alkanes in which the ratio of halogen to carbon was at least 1:1 are capable of dissolving tetrafluoroethylene epoxide and are inert toward the epoxide. Sufficient solubility with respect to the catalyst is established by testing the solubility of the haloalkane with respect to tetramethyl ammonium fluoride. If the halogenated alkane is able to dissolve at least 0.001 weight percent of the quaternary fluoride at normal temperatures, it can be employed in the process of the present invention. This test, therefore, provides a simple method of determining those halogenated alkanes which are suitable in the process of the invention. The preferred solvents are those which have the general formula $VC_pF_{2p}CH_2Cl$, in which X is a halogen or hydrogen and $p$ varies from 1 to 11 carbon atoms. Examples of other suitable solvents are methylene chloride, chloroform, 1,2-dichloroethane, 1,1,2-trichloroethane and 1,1,2,3-tetrachloropropane. The aforesaid methods employed for the reaction of tetrafluoroethylene epoxide may also be employed in the reaction of hexafluoropropylene epoxide.

The catalysts suitable for the reaction of the hexafluoropropylene epoxide with the alpha-fluorosulfonyl perfluoroacyl fluoride are the alkali metal fluorides, quaternary ammonium fluorides, silver fluoride and alkali metal perfluoroalkoxides. The metal fluorides may be used as such or admixed with other alkali metal halides. Such mixtures are, for example, mixtures of LiCl-CsF, LiCl-KF and LiBr-KF. The catalysts employed in the reaction of the tetrafluoroethylene epoxide with the alpha-fluorosulfonyl perfluoroacyl fluorides are quaternary ammonium salts containing the radical $R_4N^+$ in which R is a hydrocarbon radical, and preferably an aliphatic hydrocarbon radical of 1 to 18 carbon atoms. Although the actual catalyst is the quaternary fluoride, any quaternary ammonium salt having the $R_4N^+$ radical may be employed, since the quaternary fluoride is formed in situ by reaction of the quaternary salt with either the acid fluoride or tetrafluoroethylene epoxide. The formation of the fluoride takes place at all suitable reaction conditions. Thus, such salts are carboxylates, chlorides, iodides, bromides, cyanides and quaternary salts of other monovalent anions. Examples of the quaternary ammonium salts useful in the present invention are tetraethyl ammonium cyanide, tetraethyl ammonium bromide, tetrabutyl ammonium acetate, trimethylcetyl ammonium fluoride, and dimethyl dibutyl ammonium cyanide. Catalyst concentration is not critical and amounts of catalyst are determined by the environment in which the reaction is carried out. In general, the concentration of the catalyst is at least 0.01 percent by weight of the fluorocarbon epoxide. The catalyst may be present either in solution or as a separate phase.

Reaction temperatures may be greatly varied from $-80$ to $200°$ C., although a preferred range is from $-50°$ to $100°$ C. Pressures ranging from below atmospheric pressure to several hundred atmospheres have been employed and it has been established that pressure is not a critical factor in the process described. Pressure is primarily employed for convenience depending on the physical properties of the reactants at any selected reaction temperature. The fluorocarbon ethers of the present invention include the addition product of the fluorocarbon epoxide and the alpha-fluorosulfonyl perfluoroacyl fluoride and the polyethers formed by the reaction of one mole of the alpha-fluorosulfonyl perfluoroacyl fluoride with more than one mole of the fluorocarbon epoxide. The degrees of polymerization obtained depends on the reaction temperature and the mole ratio of the fluorocarbon epoxide to the alpha-fluorosulfonyl perfluoroacyl fluoride. At high temperatures, a lower degree of polymerization is obtained than at lower temperatures because of consumption of epoxide in unwanted side reactions. However, the reaction is more strongly affected by the ratio of reactants. Thus, at mole ratios of 1:1, substantially only the 1:1 addition product is formed. As the ratio of the fluorocarbon epoxide to the alpha-fluorosulfonyl perfluoroacyl fluoride is increased, products with higher degrees of polymerization are obtained. It is, however, to be realized that this control over the nature of the fluorocarbon ethers obtained by the process of the present invention is not absolute and does not prevent the formation of some fluorocarbon ethers of either higher or lower molecular weight or both.

The alpha-fluorosulfonyl perfluoroacyl fluorides employed in the formation of the desired fluorocarbon ethers are illustrated in U.S. Patent 2,852,554, supra. Specific examples of these acyl fluorides are fluorosulfonyl difluoroacetyl fluoride, fluorosulfonyl(trifluoromethyl)fluoroacetyl fluoride, fluorosulfonyl(perfluoroethyl)fluoroacetyl fluoride, and fluorosulfonyl(perfluoropentyl)fluoroacetyl fluoride.

The present invention is further illustrated by the following examples, in which all temperatures are in centigrade.

Example I

Into a 320 ml. stainless steel shaker tube were charged 90 g. fluorosulfonyl difluoroacetyl fluoride, 60 ml. of dry dimethyl ether of diethylene glycol, 1.5 g. of dry cesium fluoride, and 90 g. of hexafluoropropylene epoxide. The shaker tube was agitated at 25–35° C. for 4 hours. The products were discharged from the tube and the lower fluorocarbon layer was separated. Fractional distillation yielded 84.7 g. (56% yield) of 2-(2'-fluorosulfonyl tetrafluoroethoxy) tetrafluoropropionyl fluoride, boiling point 87–89° C., density at 25° C., 1.6 g. per cc. Infrared and NMR spectra were consistent with this structure.

Example II

Into a clean, dry flask was placed 2.9 g. of dry cesium fluoride. The flask was attached to a manifold, evacuated and cooled in an ice bath. Forty ml. of dry dimethyl ether of diethylene glycol and 50 g. of fluorosulfonyl difluoroacetyl fluoride were injected into the flask through a rubber stopper attached to a side arm. The valve to the manifold was then opened and 115 g. of hexafluoropropylene epoxide was pressured into the flask through a reduction valve at 4 p.s.i.g. Complete uptake of the epoxide occurred within 30 minutes. The lower fluorocarbon layer (158 g.) was separated and distilled. There was obtained 40 g. of a fraction boiling at 138.5–141° (A) and 38 g. of a fraction boiling at 179–181° (B). The residue consisted of a mixture of higher polymers of the same general structure as A and B. Fraction A was shown by IR and NMR spectra as well as elemental analyses to be the adduct of 2 moles of hexafluoropropylene epoxide with one of fluorosulfonyl difluoroacetyl fluoride of structure $$FSO_2CF_2CF_2OCF(CF_3)CF_2OCF(CF_3)COF$$

*Analysis.*—Calcd. for $C_8F_{16}O_5S$: C, 18.76; F, 59.4; S, 6.26; N.E. 128. Found: C, 18.8; F, 58.3; S, 6.4; N.E. 131.

Fraction B was identified as the adduct of 3 moles of hexafluoropropylene epoxide with one mole of fluorosulfonyl difluoroacetyl fluoride of structure $$FSO_2CF_2CF_2O[CF(CF_3)CF_2O]_2CF(CF_3)COF$$

*Analysis.*—Calcd. for $C_{11}F_{22}O_6S$: C, 19.5; F, 61.6; S, 4.7; N.E. 170. Found: C, 19.4; F, 61.6; S, 4.6; N.E. 176.

The residue has the general formula $$FSO_2CF_2O[CF(CF_3)CF_2O]_nCF(CF_3)COF$$

where $n$ varies from 3 to 12.

Example III

In a dry copper reaction vessel containing a magnetic stirrer and attached to a manifold were placed 200 mg. of tetraethylammonium cyanide and 16 ml. of 1-chloro-2,2,3,3-tetrafluoropropane. The vessel was cooled to −30° and 1 g. of tetrafluoroethylene epoxide was introduced. After absorption of the epoxide there was added 56 g. of fluorosulfonyl difluoroacetyl fluoride. The vessel was warmed to 0° and 36 g. of tetrafluoroethylene epoxide was introduced within a period of one hour. Distillation of the reaction mixture afforded 2-fluorosulfonyl tetrafluoroethoxydifluoroacetyl fluoride as the only product boiling point 67–69°. The structure of this product was confirmed by IR and NMR spectra as well as elemental analyses.

*Analysis.*—Calcd. for $C_4F_8O_4S$: C, 16.4; F, 51.8. Found: C, 16.7; F, 50.0.

Repetition of this experiment using 14.8 g. of fluorosulfonyl difluoroacetyl fluoride and 29 g. of tetrafluoroethylene epoxide afforded polymers of the structure $$FSO_2CF_2CF_2O(CF_2CF_2O)_nCF_2COF$$

Distillation of the product afforded 1.1 g. of the fraction where $n=0$, 14.4 g. of the fraction in which $n=1$, 9.5 g. of the fraction corresponding to $n=2$ and 9.3 g. of the fraction corresponding to $n=3$ and $n=4$. The residue contains polyethers of the illustrated formula where $n=5$ to 12. The product in which $n=0$ is further reacted with hexafluoropropylene epoxide in the presence of cesium fluoride and dimethyl ether of ethylene glycol to give $$FSO_2CF_2CF_2OCF_2CF_2OCF(CF_3)COF$$

as the main product.

Example IV

A mixture of 51.2 g. of $$FSO_2CF_2CF_2OCF(CF_3)CF_2OCF(CF_3)COF$$

and 50 ml. of water was shaken in a polyethylene bottle for 5 minutes and the layers were then separated. There was obtained 45.1 g. of $$FSO_2CF_2CF_2OCF(CF_3)CF_2OCF(CF_3)CO_2H$$

boiling point 119–120° at 20 mm. The product gave an equivalent weight of 173 (theory 170).

Example V

Into 80 ml. of anhydrous ammonia at −78° were dropped 33 g. of $$FSO_2CF_2CF_2OCF(CF_3)CF_2OCF(CF_3)CO_2H$$

The ammonium fluoride formed was removed by filtration and the excess ammonia was removed from the product by evaporation. The product, $$NH_2SO_2CF_2CF_2OCF(CF_3)CF_2OCF(CF_3)CO_2NH_4$$

titrates as a weak acid with an equivalent weight of 528. At 50% neutralization a pH of 6.0 is obtained.

Example VI

Into 50 ml. of anhydrous ammonia at −78° were slowly dropped 51.2 g. of $$FSO_2CF_2CF_2OCF(CF_3)CF_2OCF(CF_3)COF$$

After the evaporation of most of the ammonia the product was dissolved in water and the desired diamide was precipitated by the addition of HCl. The product had the formula $$NH_2SO_2CF_2CF_2OCF(CF_3)CF_2OCF(CF_3)CONH_2$$

*Example VII*

Sixty-eight grams of $$FSO_2CF_2CF_2O[CF(CF_3)CF_2O]_2CF(CF_3)COF$$

were hydrolyzed as described in Example IV in the lower fluorocarbon layer was then treated with a solution of 13 g. of sodium hydroxide in 100 ml. of water. Addition of sulfuric acid to the reaction mixture caused precipitation of $$HSO_3CF_2CF_2O[CF(CF_3)CF_2O]_2CF(CF_3)CO_2H$$

This acid was neutralized with sodium hydroxide solution and excess water was removed under vacuum to yield the disodium salt, $$NaSO_3CF_2CF_2O[CF(CF_3)CF_2O]_2CF(CF_3)CO_2Na$$

*Example VIII*

Following the procedure of Example II, hexafluoropropylene epoxide is reacted with fluorosulfonyl(trifluoromethyl) fluoroacetyl fluoride. The polyether formed has the formula $$FSO_2CF(CF_3)CF_2O[CF(CF_3)CF_2O]_nCF(CF_3)COF$$

where $n$ varies from 0 to 12.

*Example IX*

Following the procedure of Example III, tetrafluoroethylene epoxide is reacted with fluorosulfonyl(trifluoromethyl) fluoroacetyl fluoride. The fluorocarbon ether formed has the formula $$FSO_2CF(CF_3)CF_2OCF_2COF$$

*Example X*

Following the procedure of Example I, hexafluoropropylene epoxide is reacted with fluorosulfonyl(perfluoropentyl)fluoroacetyl fluoride. The fluorocarbon ether obtained has the formula $$FSO_2CF(C_5F_{11})OCF(CF_3)COF$$

The fluorocarbon ether acids, ammonium salts and alkali metal salts of the present invention have utility as dispersing agents. The fluorocarbon ether acids of the present invention are further of utility in the formation of vinyl ethers by the following reactions:

$$FSO_2CFR_fCF_2-O[CFX-CF_2-O-]_nCFCF_3$$
$$-COONa \rightarrow FSO_2CFR_fCF_2O[CFXCF_2O]_nCF=CF_2$$

where $R_f$, $X$ and $n$ have the above-indicated meaning.

These vinyl ethers can be polymerized to give valuable ion exchange resins.

We claim:
1. A fluorocarbon ether having the general formula

$$YSO_2CFR_fCF_2O(CFXCF_2O)_nCFXCOY$$

where $R_f$ is a radical selected from the class consisting of fluorine and perfluoroalkyl radicals having from 1 to 10 carbon atoms, X is a radical selected from the class consisting of fluorine and the trifluoromethyl radical and mixtures thereof where the formula contains more than one X, and Y is a radical selected from the class consisting of fluorine, amino, hydroxyl and radicals having the formula —OMe, where Me is a group selected from the class consisting of ammonium and alkali metals and where $n$ is a number from 0 to about 12, inclusive.

2. The fluorocarbon ether of claim 1 having the formula $$YSO_2CFR_fCF_2O[CF(CF_3)CF_2O]_nCF(CF_3)COY$$

3. The fluorocarbon ether of claim 1 having the formula $$YSO_2CFR_fCF_2O(CF_2CF_2)O_nCF_2COY$$

4. A fluorocarbon ether having the formula $$YSO_2CF_2CF_2O[CF(CF_3)CF_2O]_nCF(CF_3)COY$$

where Y is a radical selected from the class consisting of fluorine, amino, hydroxyl and radicals having the formula —OMe, where Me is a group selected from the class consisting of ammonium and alkali metals and where $n$ is a number of 0 to about 12, inclusive.

5. A fluorocarbon ether having the formula $$YSO_2CF_2CF_2O(CF_2CF_2O)_nCF_2COY$$

where Y is a radical selected from the class consisting of fluorine, amino, hydroxyl and radicals having the formula OMe, where Me is a group selected from the class consisting of ammonium and alkali metals and where $n$ is a number from 0 to about 12, inclusive.

6. A fluorocarbon ether having the formula $$YSO_2CF_2CF_2OCF(CF_3)CF_2OCF(CF_3)COY$$

where Y is a radical selected from the class consisting of fluorine, amino, hydroxyl and radicals having the formula —OMe, where Me is a group selected from the class consisting of ammonium and alkali metals.

7. A fluorocarbon ether having the formula $$YSO_2CF_2CF_2OCF(CF_3)COY$$

where Y is a radical selected from the class consisting of fluorine, amino, hydroxyl and radicals having the formula —OMe, where Me is a group selected from the class consisting of ammonium and alkali metals.

References Cited by the Examiner

UNITED STATES PATENTS 3,114,778   12/1963   Fritz et al. _____ 260—544

LORRAINE A. WEINBERGER, *Primary Examiner.*

RICHARD K. JACKSON, *Examiner.*